United States Patent
Yoshida et al.

(10) Patent No.: US 9,620,962 B2
(45) Date of Patent: Apr. 11, 2017

(54) POWER SUPPLY DEVICE AND ELECTRIC APPARATUS

(71) Applicants: Masaaki Yoshida, Kanagawa (JP); Masami Takai, Tokyo (JP)

(72) Inventors: Masaaki Yoshida, Kanagawa (JP); Masami Takai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 460 days.

(21) Appl. No.: 14/135,807

(22) Filed: Dec. 20, 2013

(65) Prior Publication Data
US 2014/0183954 A1    Jul. 3, 2014

(30) Foreign Application Priority Data
Dec. 28, 2012 (JP) ................. 2012-287142

(51) Int. Cl.
H02J 1/10 (2006.01)
H02J 3/00 (2006.01)
H02J 3/46 (2006.01)
H02J 3/32 (2006.01)

(52) U.S. Cl.
CPC ........ *H02J 3/46* (2013.01); *H02J 3/32* (2013.01); *Y10T 307/587* (2015.04)

(58) Field of Classification Search
USPC ............................................. 307/4, 59
See application file for complete search history.

(56) References Cited

U.S. PATENT DOCUMENTS

| | | | |
|---|---|---|---|
| 7,733,061 B2 | 6/2010 | Zemke et al. | |
| 7,952,231 B1* | 5/2011 | Zansky | H02J 7/34 307/44 |
| 2002/0186576 A1* | 12/2002 | Kanouda | H02J 9/061 363/125 |
| 2011/0095729 A1* | 4/2011 | Tsuji | H02J 7/0068 320/162 |

(Continued)

FOREIGN PATENT DOCUMENTS

| | | | |
|---|---|---|---|
| GB | 2474305 | * | 4/2011 |
| GB | 2474305 A | | 4/2011 |

(Continued)

OTHER PUBLICATIONS

European search report dated Jul. 28, 2015 in corresponding European Patent Application No. 13199175.4.

*Primary Examiner* — Rexford Barnie
*Assistant Examiner* — Xuan Ly
(74) *Attorney, Agent, or Firm* — Cooper & Dunham LLP

(57) ABSTRACT

A power supply device is connected to an external power supply and supplies electric power to a load. The power supply device includes a battery terminal that is used to connect a secondary battery, a superposition unit that superposes second electric power output from the secondary battery on first electric power supplied from the external power supply, and that outputs resultant electric power to the load; a power consumption amount retrieve unit that retrieves a power consumption amount of the load; and a controller that controls an amount of the second electric power to be output from the secondary battery, based on the power consumption amount.

9 Claims, 13 Drawing Sheets

(56) References Cited

U.S. PATENT DOCUMENTS

2011/0118894 A1\* 5/2011 Reineccius ............... H02J 4/00
                                                                         700/296
2015/0145476 A1\* 5/2015 Toya ................... H01M 10/441
                                                                         320/109

FOREIGN PATENT DOCUMENTS

| | | |
|---|---|---|
| JP | 2006-191796 | 7/2006 |
| JP | 2011-097669 | 5/2011 |

\* cited by examiner

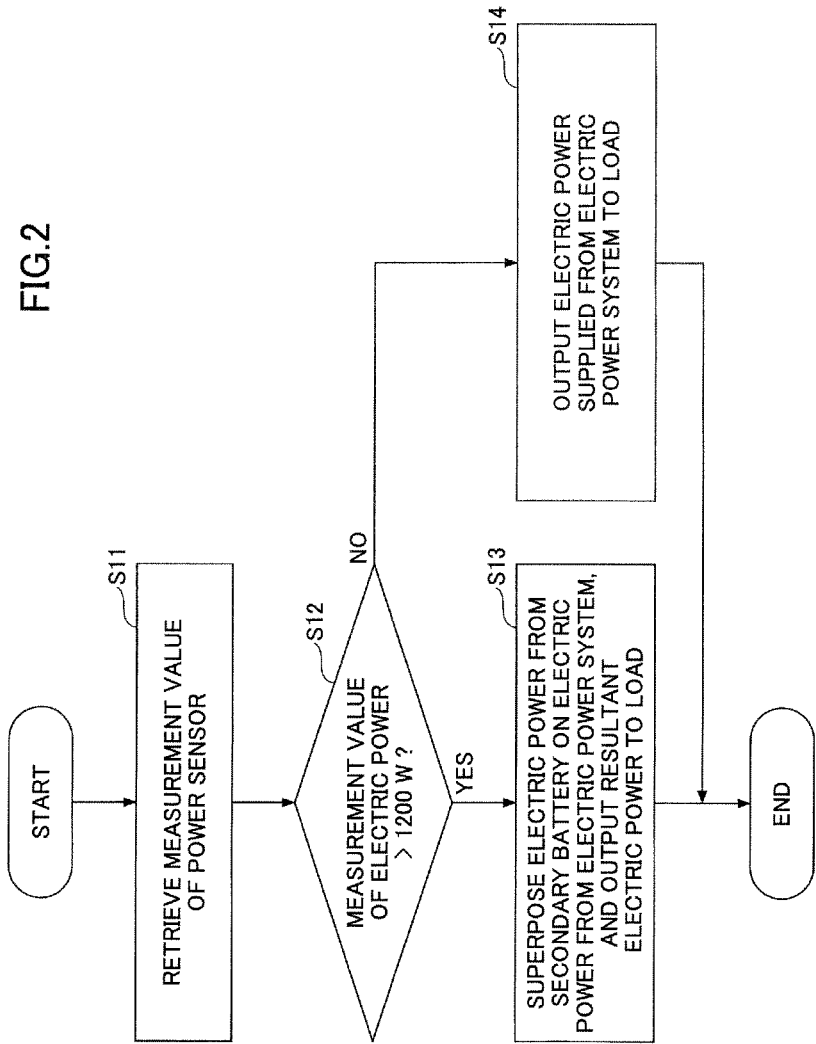

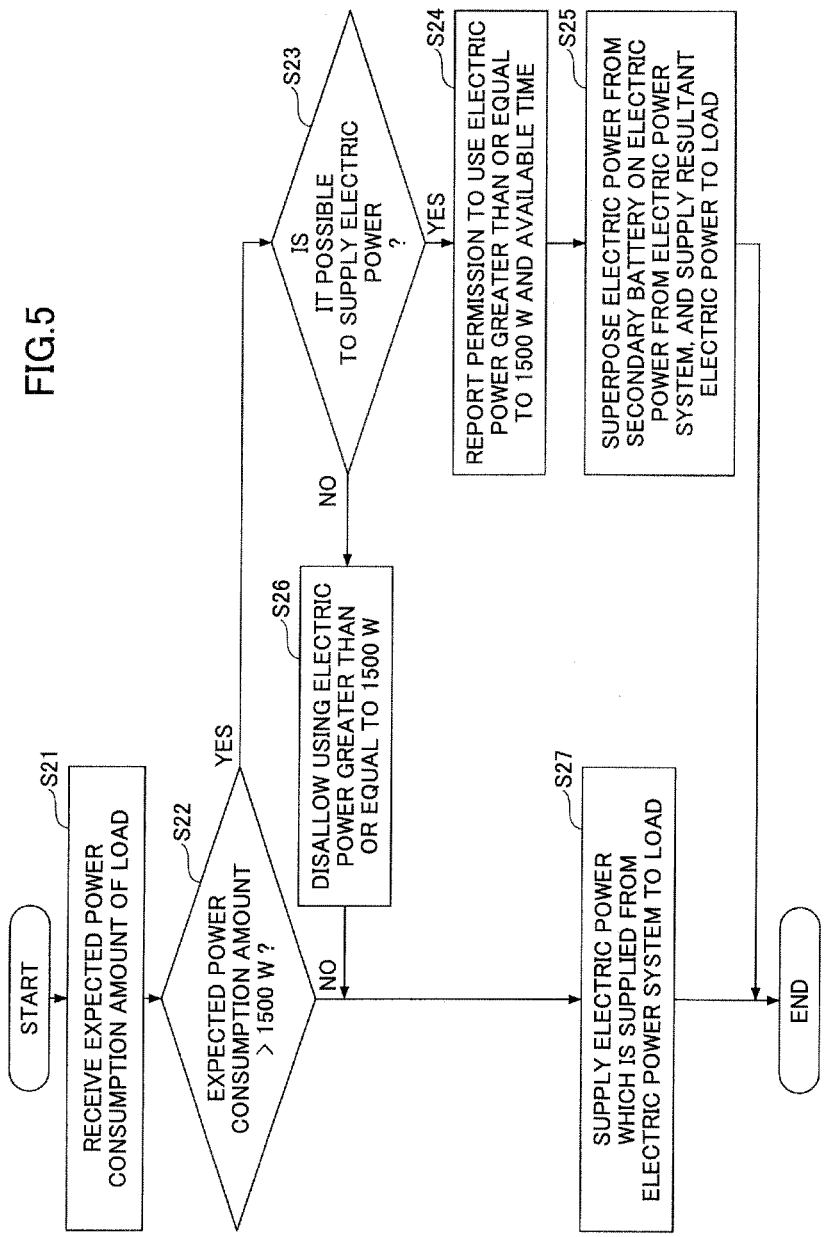

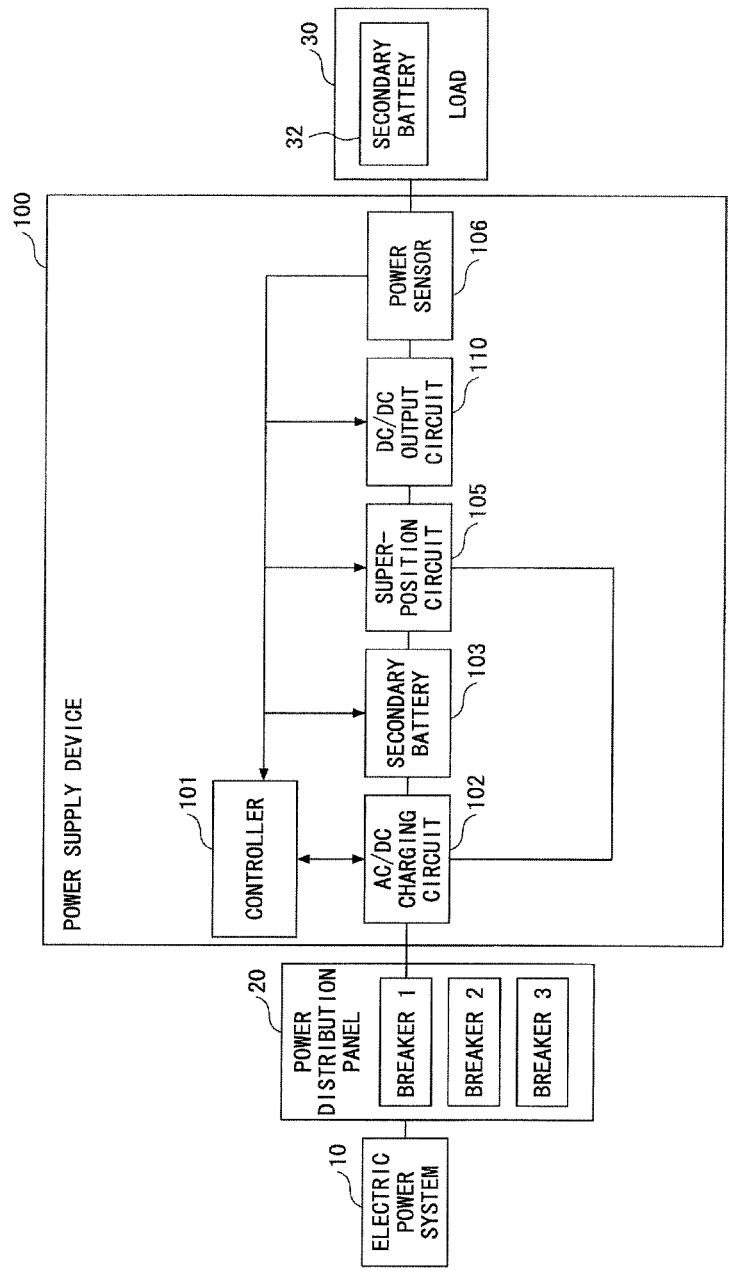

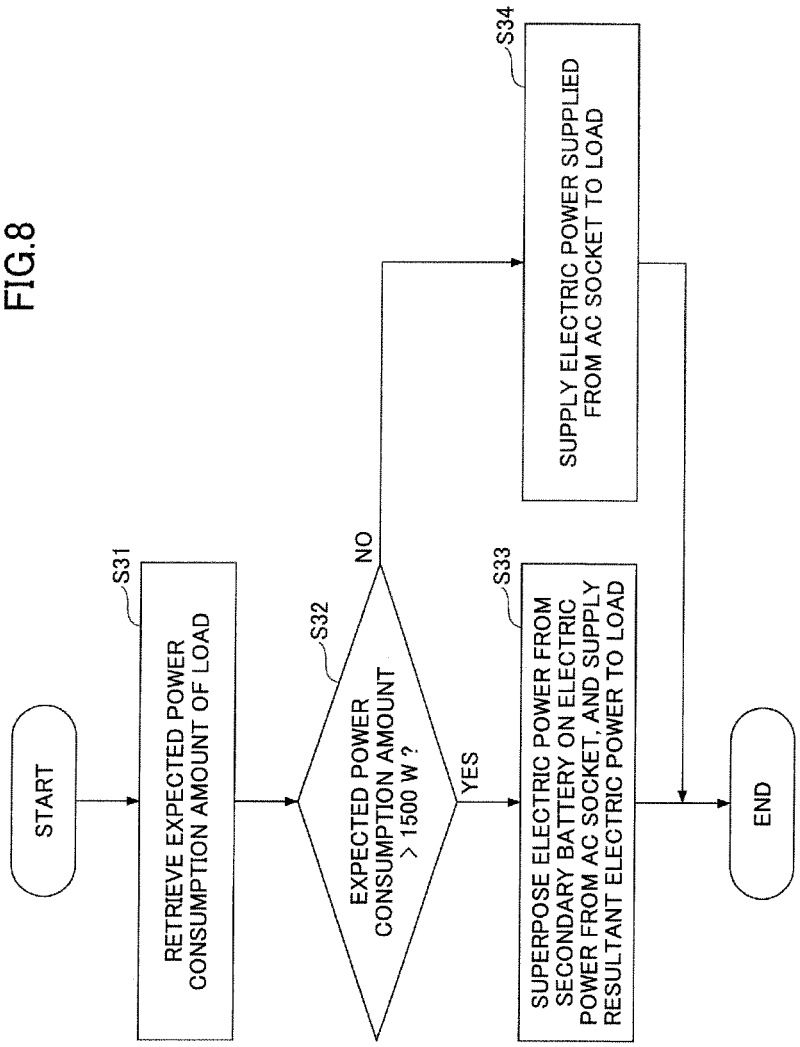

POWER SUPPLY DEVICE AND ELECTRIC APPARATUS

BACKGROUND OF THE INVENTION

1. Field of the Invention

The present invention relates to a power supply device and an electric apparatus.

2. Description of the Related Art

An electric device that is used in a home, an office, or the like (e.g., a hair dryer, an electric water heater, or a microwave oven) is connected to a power source (e.g., a plug socket) disposed in a service space. The electric device operates by receiving electric power supply. For the home, the office, or the like (in which such an electric device is utilized), the maximum power amount is defined, which can be supplied from the power source. When power consumed by the electric device or the like exceeds a certain power amount, a circuit breaker cuts off the power, and thereby terminating the electric power supply. Accordingly, the above-described various electric devices are designed, in general, to operate within a range in which the power consumed by the electric devices does not exceed the maximum power amount, so that the plurality of electric devices can be used simultaneously.

Among electric devices, there are some electric devices that can more effectively demonstrate their functions, when the power supplied to each of the devices exceeds the maximum power amount of the power supply. For example, for the hair dryer, by using greater electric power, an air volume and temperature of blown-out warm air can be increased. For the electric water heater, also by using greater electric power, a time period for boiling water can be reduced.

As a method of supplying electric power to a load, a technique has been disclosed such that power output from a secondary battery (e.g., a lithium-ion battery) is added to power supplied from a power source, and the resultant power is applied to a load (cf. Patent Document 1 (Japanese Unexamined Patent Publication No. 2006-191796), for example).

SUMMARY OF THE INVENTION

With the technique according to the above-described Patent Document 1, it is possible to prevent an output voltage being supplied to a load (e.g., an electric device) from lowering. However, it is difficult to supply power exceeding the maximum power amount that can be supplied from an external power supply to the load.

An embodiment of the present invention has been developed in view of the above-described point. It is desirable to provide a power supply device that is capable of supplying power exceeding the maximum power amount that can be supplied from an external power source to a load.

According to an aspect of the present invention, there is provided a power supply device that is to be connected to an external power supply and that supplies electric power to a load. The power supply device includes a battery tem al that is sad to connect a secondary battery; a superposition unit that superposes second electric power output from the secondary battery on first electric power supplied from the external power supply, and that outputs resultant electric power to the load; a power consumption amount retrieve unit that retrieves a power consumption amount of the load; and a controller that controls an amount of the second electric power to be output from the secondary battery, based on the power consumption amount.

According to another aspect of the present invention, there is provided an electric apparatus including a load; and a power supply device that is to be connected to an external power supply and that supplies electric power to the load, wherein the power supply device includes a battery terminal that is used to connect a secondary battery; a superposition unit that superposes second electric power output from the secondary battery on first electric power supplied from the external power supply, and that outputs resultant electric power to the load; a power consumption amount retrieve unit that retrieves a power consumption amount of the load; and a controller that controls an amount of the second electric power to be output from the secondary battery, based on the power consumption amount.

According to the embodiment of the present invention, a power supply device can be provided such that it may supply electric power exceeding the maximum power amount which can be supplied from an external power supply.

Other objects, features and advantages of the present invention will become more apparent from the following detailed description when read in conjunction with the accompanying drawings.

BRIEF DESCRIPTION OF THE DRAWINGS

FIG. 2 shows an example of a flowchart of a power supply process according to the first example;

FIG. 5 shows an example of a flowchart of the power supply process according to the second example;

FIGS. 6A and 6B are diagrams exemplifying configurations of the power supply device according to a third example;

FIG. 8 is a diagram exemplifying a flowchart of the power supply process according to the fourth example.

DETAILED DESCRIPTION OF THE PREFERRED EMBODIMENTS

Figure 1A:
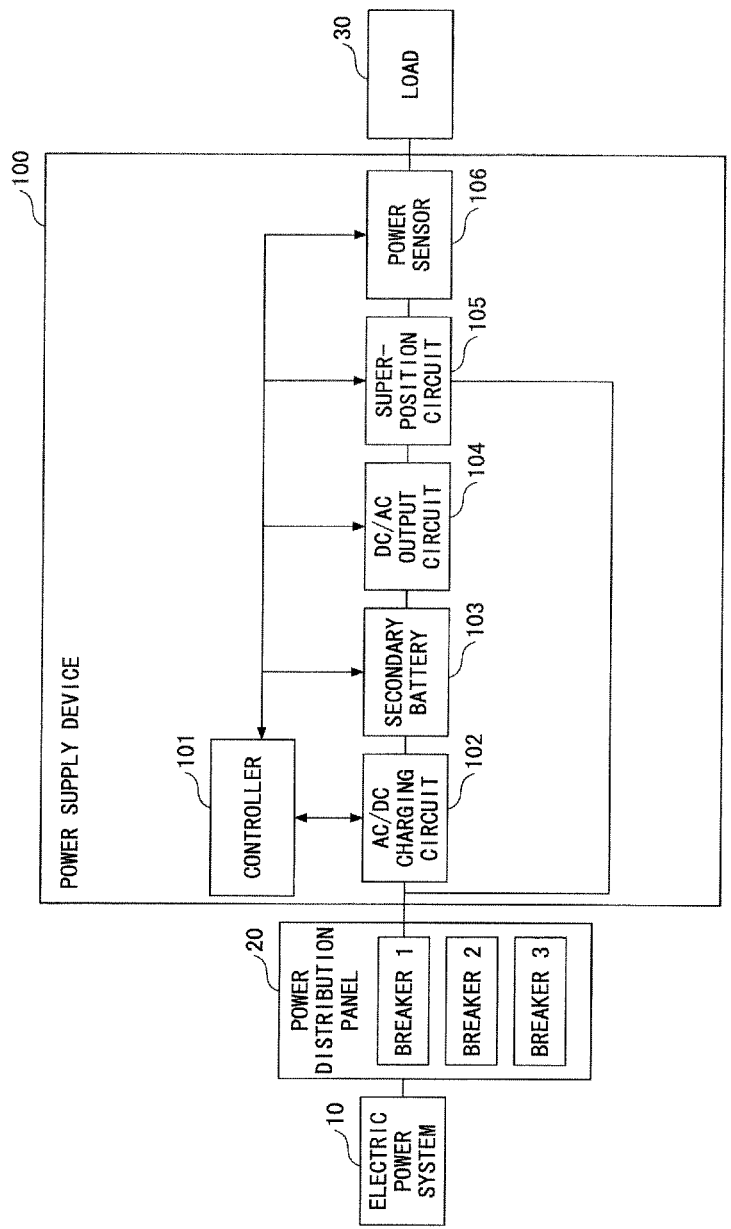
FIGS. 1A and 1B are diagrams exemplifying configurations of a power supply device according to a first example.

Hereinafter, a configuration for implementing the present invention is explained by referring to the accompanying drawings. In the drawings, the same reference symbol may be attached to the same portions of the configuration, and thereby duplicated explanations may be omitted.

First Example

FIG. 1A is a diagram exemplifying a schematic configuration of a power supply device 100 according to a first example.

As depicted in FIG. 1A, a power distribution panel 20 is connected to an external power supply through a breaker 1, and the power distribution panel 20 supplies electric power to a load 30. The power distribution panel 20 includes a plurality of breakers 1-3, for example. When electric power which is greater than or equal to 1500 W, for example, is supplied to the power supply device 100, corresponding one of the breakers 1-3 cuts down supply of the electric power from the electric power system 10.

The power supply device 100 includes a controller 101; an AC/DC charging circuit 102; a secondary battery 103; a DC/AC output circuit 104; a superposition circuit 105; and a power sensor 106.

The controller 101 is an example of a control unit. The controller 101 controls, for example, the AC/DC charging circuit 102; the secondary battery 103; the DC/AC output circuit 104; and the superposition circuit 105. The controller 101 controls the DC/AC output circuit 104 in accordance with a value of an amount of electric power supplied from the superposition circuit 105 to the load 30, and thereby the controller 101 may cause the secondary battery 103 to output electric power to the superposition circuit 105. Here, the value of the amount of the electric power supplied from the superposition circuit 105 to the load 30 is measured by the power sensor 106. The controller 101 includes, for example, a central processing unit (CPU) and a read-only memory (ROM). The controller 101 may be achieved by reading out a control program stored in the ROM, for example; by writing the control program in a main memory; and by executing the control program by the CPU.

The AC/DC charging circuit 102 converts alternating-current (AC) power supplied from the electric power system 10 through the breaker 1 of the power distribution panel 20 into direct-current (DC) power, and thereby the AC-DC charging circuit charges the secondary battery 103. Here, when the load 30 is used while the load 30 is connected to the power supply device 100, supply of the power to the load 30 is prioritized.

As the secondary battery 103, for example, a lead storage battery or a lithium ion secondary battery may be utilized. It is preferable that the capacity of the secondary battery 103 be greater, and that charging and discharging speed of the secondary battery 103 be greater.

The DC/AC output circuit 104 is controlled by the controller 101, and thereby the DC/AC output circuit 104 outputs necessary power from the power stored in the secondary battery 103, while converting the necessary power into AC power.

The superposition circuit 105 is an example of a superposition unit. The superposition circuit 105 superposes power output from the secondary battery 103 on power supplied from the electric power system 10 through the breaker 1 of the power distribution panel 20, and the superposition circuit 105 supplies the resultant power to the load 30. When the DC/AC output circuit 104 does not output power from the secondary battery 103, the superposition circuit 105 only supplies power from the electric power system 10 to the load 30. The superposition circuit 105 also includes a function to adjust an effective voltage, a phase, and a frequency of the electric power system 10 to a voltage, a phase, and a frequency, which are output from the secondary battery 103, respectively.

Figure 1B:
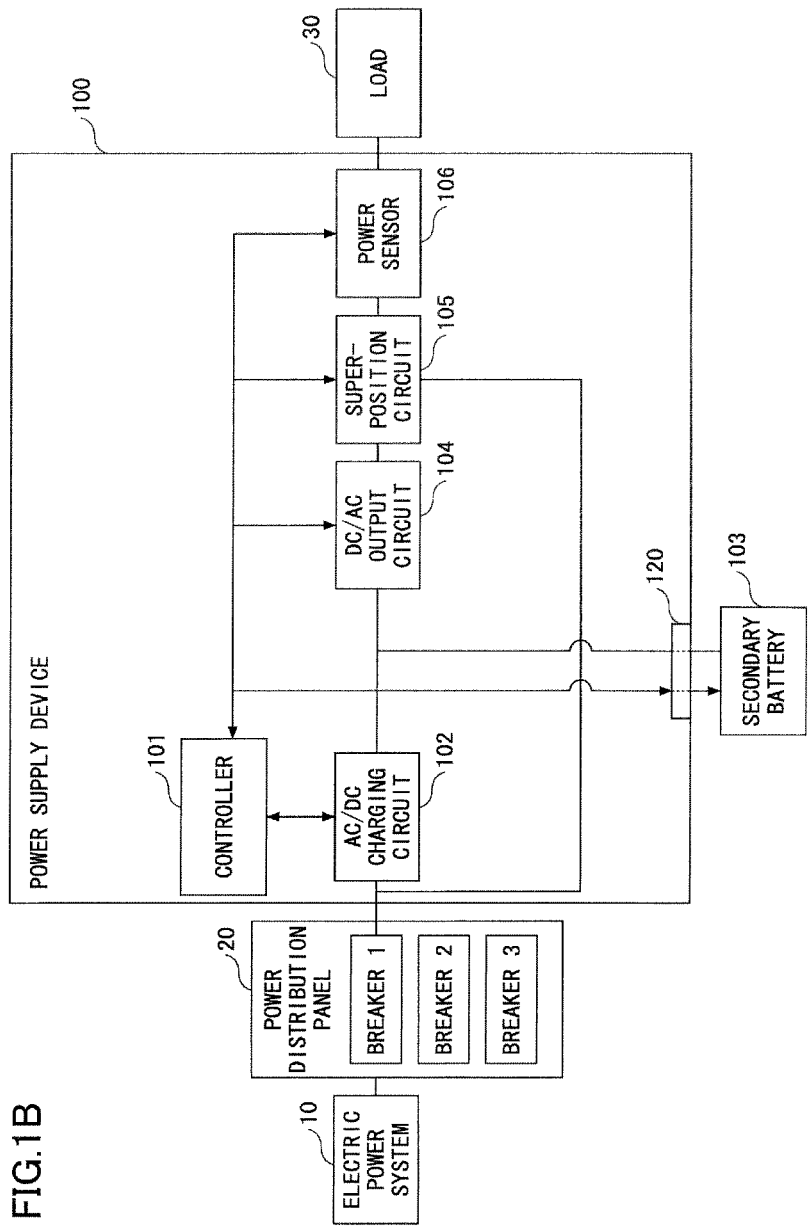

Here, as shown in FIG. 1B, the secondary battery 103 may be detachably attached to the power supply device 100 as an external battery. The power supply device 100 may include a battery terminal 120 that is used to connect a secondary battery 103.

The power sensor 106 is an example of a power consumption amount retrieve unit. The power sensor 106 measures an amount of power which is output from the superposition circuit 105 and applied to the load 30. When an amount of power consumed by the load 30 increases, the amount of power supplied from the superposition circuit 105 to the load 30 increases. Here, as another example of the power consumption amount retrieval unit, a current sensor may be utilized, which measures an electric current flowing from the superposition circuit 105 to the load 30.

In the power supply device 100, the power sensor 106 measures an amount of power supplied from the superposition circuit 105 to the load 30, as the load 30 is used. The controller 101 controls the DC/AC output circuit 104 in accordance with a result of the measurement of the power sensor 106, and the DC/AC output circuit 104 causes the secondary battery 103 to output power. When the secondary battery 103 outputs power, the superposition circuit 105 superposes the power output from the secondary battery 103 on the power supplied from the electric power system 10. In this manner, the power supply device 100 can supply power, which is greater than or equal to a power limit, to the load 30. Here, power from the electric power system 10 is regulated to be less than or equal to the power limit by the breaker 1 of the power distribution panel 20.

FIG. 2 shows an example of a flowchart of a power supply process according to the first example.

In the power supply process of the power supply device 100, at step S11, the controller 101 retrieves a value which is measured by the power sensor 106. Subsequently, at step S12, the controller 101 determines whether the measured value by the power sensor 106 is greater than a predetermined amount of power (e.g., 1200 W). Here, a value to be compared with the measured value of the power sensor 106 may be suitably adjusted by the controller 101. However, it is preferable to adjust the value (which is to be compared with the measured value) to be less than the power limit defined by the breaker 1 of the power distribution panel 20 (which is 1500 W, in this example).

When the measured value of the power sensor 106 is greater than 1200 W, at step S13, the controller 101 controls the DC/AC output circuit 104, and thereby the DC/AC output circuit 104 causes the secondary battery 103 to output electric power. In this case, the controller 101 causes the secondary battery 103 to output the electric power which corresponds to a difference between the measured value of the power sensor 106 and the predetermined amount of power.

When the DC/AC output circuit 104 outputs electric power from the secondary battery 103, the superposition circuit 105 superposes the electric power from the secondary battery 103 on electric power supplied from the electric power system 10, and the resultant electric power is supplied to the load 30. Accordingly, the load 30 can operate by receiving electric power which greater than electric power supplied from the electric power system 10 through the breaker 1.

When the measured value of the power sensor 106 is less than or equal to 1200 W, at step S14, the controller 101 causes the secondary battery 103 not to output electric power, and the controller 101 causes only electric power supplied from the electric power supply system 10 to be supplied to the load 30.

The power supply device 100 controls an electric power amount to be supplied to the load 30 by executing the above-described process by the controller 101 in a fixed cycle.

As explained above, the power supply device 100 superposes electric power output from the secondary battery 103 on electric power supplied from the electric power system 10 and outputs the resultant electric power, depending on an operating condition of the load 30. Accordingly, the load 30 can operate by receiving electric power which is greater than or equal to the power limit of the electric power system 10, which is defined by the breaker 1 of the power distribution panel 20.

The load 30 may be a generic appliance, such as an electric water heater; a water heater; a coffee maker; a hair dryer; an electric washing toilet seat; a vacuum cleaner; a microwave oven; or a toaster. Here, two or more loads 30 may be connected to the power supply device 100.

By using the power supply device 100 according to the embodiment, the load 30, such as the above-described appliances, can be used with electric power which is greater than or equal to the power limit defined by the breaker 1 of the power distribution panel 20. By increasing an amount of usable power, the electric water heater, the water heater, or the coffee maker can boil water in a shorter time period, for example. For the hair dryer, an air volume and temperature of warm air can be increased. For the electric washing toilet seat, temperature can be increased in a shorter time. For the vacuum cleaner, suction force can be increased. For the cooking appliances, such as the microwave oven or the toaster, a time period for cooking can be reduced.

As depicted in FIG. 1B, the secondary battery 103 may be detachably attached the power supply device 100 as an external battery. The power supply device 100 may include the battery terminal 120 that connect the secondary battery 103.

Figure 3A:
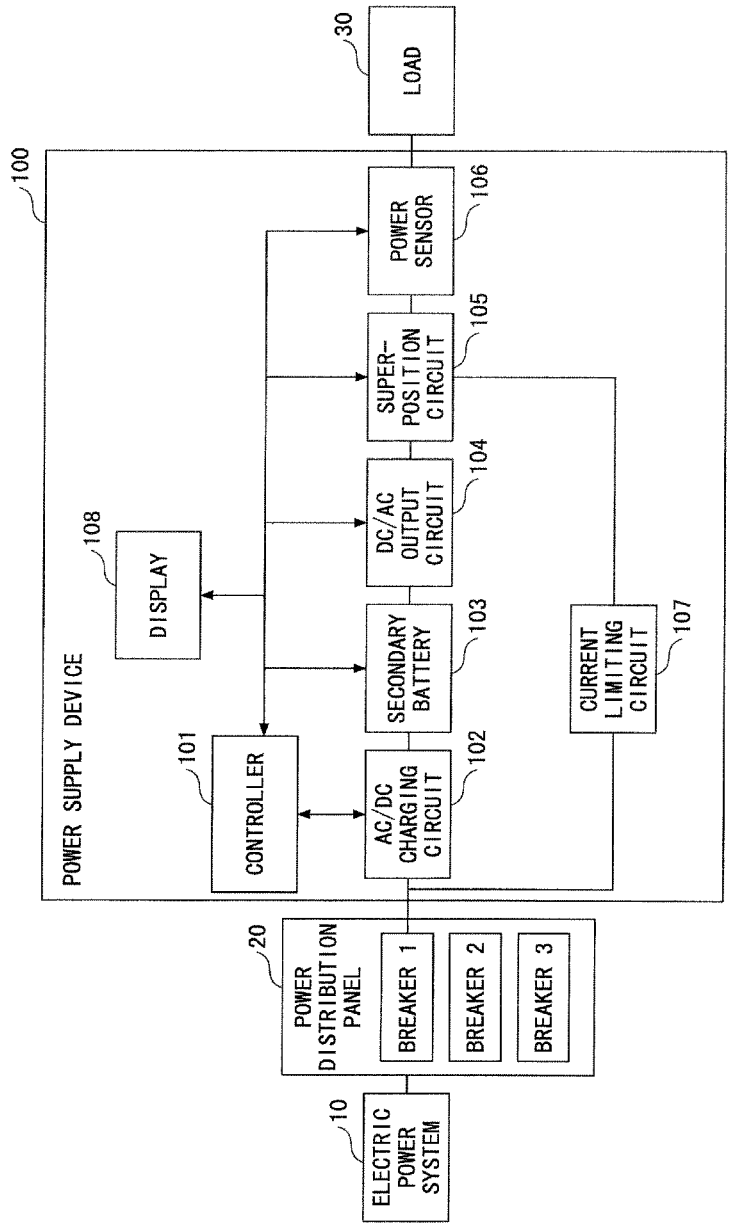
FIGS. 3A and 3B are diagrams exemplifying modified configurations of the power supply device according to the first example.
Figure 3B:
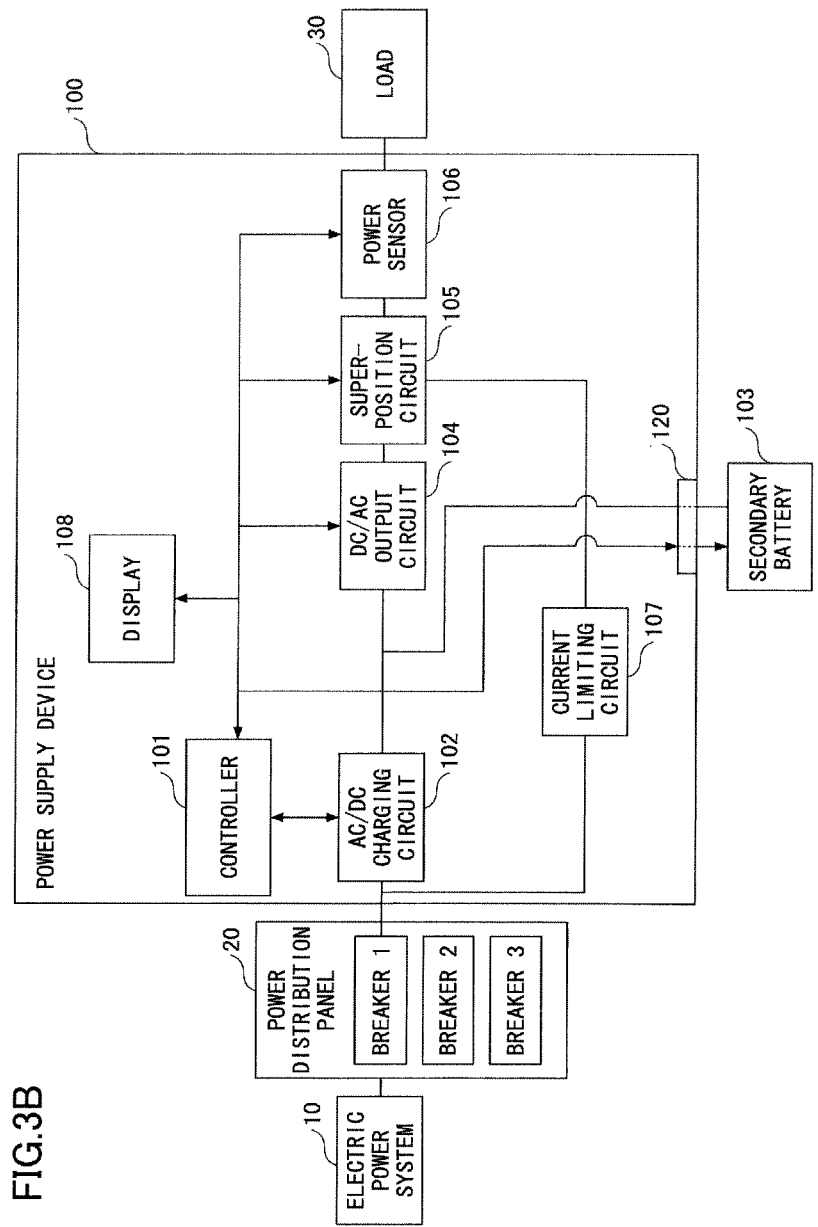

Here, as depicted in FIG. 3A, the power supply device 100 may include a current limiting circuit 107 and a display 108. Additionally, as depicted in FIG. 3O, the secondary battery may be detachably attached to the power supply device 100 as an external battery. In this case, the power supply device 100 may also include the battery terminal 120 that is used to connect the secondary battery 103.

The current limiting circuit 107 is an example of a current limiting unit. For example, the current limiting circuit 107 is disposed between the electric power system 10 and the superposition circuit 105, and the current limiting circuit 107 prevents an overcurrent (which is a current greater than or equal to a predetermined current) from flowing. The current limiting circuit 107 prevents cutting down on supply of power by the breaker 1 by preventing the overcurrent from flowing. In this manner, the current limiting circuit 107 can prevent a malfunction or damage of a load or the like, which is connected to the breaker 1.

The display 108 includes a display such as a liquid crystal display (LCD). The display 108 displays a residual electric energy amount of the secondary battery 103; and outputtable power and duration of the power supply device 100. Additionally, the display 108 may include an audio output unit or a lamp, such as an LED, and the display 108 may notify a user of shortage of a residual electric energy amount of the secondary battery 103 by sound (a buzzer) or light, for example.

Additionally, each of the power supply device 100 and the load 30 may include a communication unit. At the same time, the power sensor 106 may be included in the load 30, instead of the power supply device 100. In this case, the power sensor 106 of the load 30 measures power output from the power supply device 100, and the communication unit of the load 30 transmits a measurement result to the power supply device 100. The power supply device 100 receives the result of the measurement of the power from the load 30, and the power supply device 100 may cause the secondary battery 103 to output electric power, depending on necessity.

Second Example

Hereinafter, a second example is explained based on the drawings. Here, explanation is omitted for portions of configurations which are the same as the corresponding portions of the above-described example.

Figure 4A:
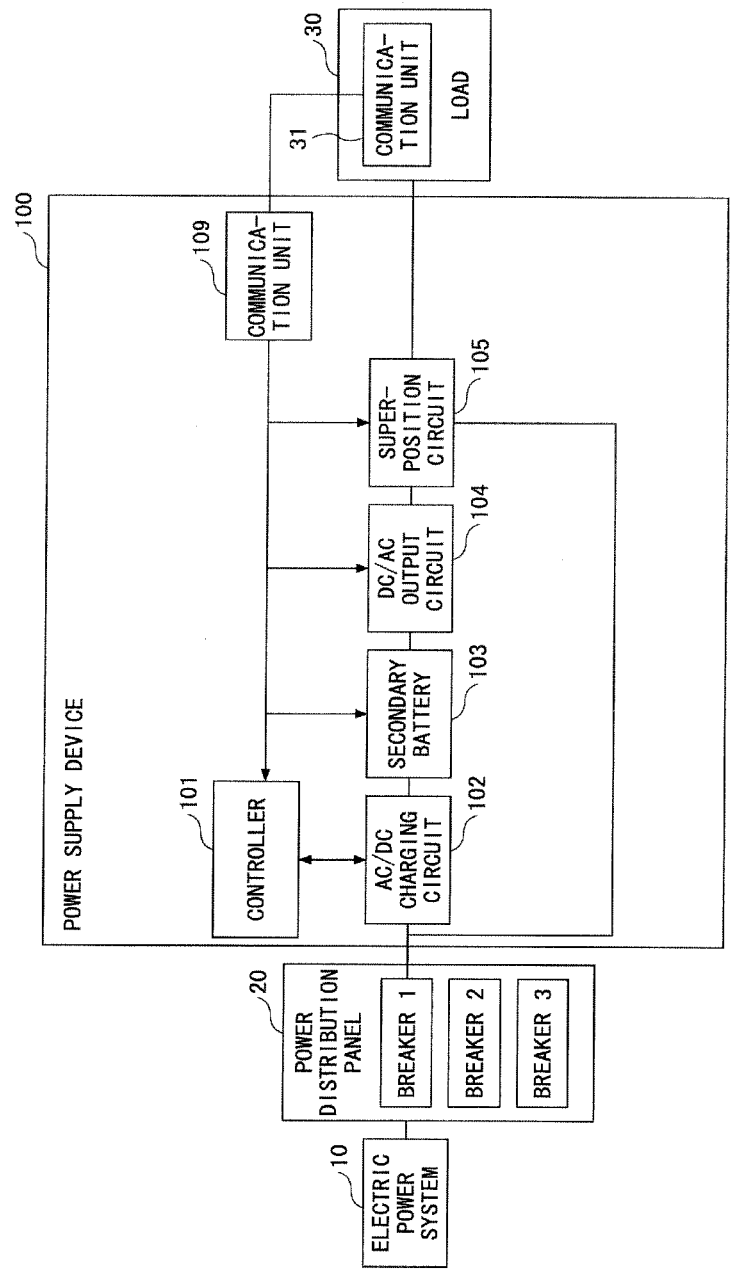
FIGS. 4A and 4B are diagrams exemplifying configurations of the power supply device according to a second example.

FIG. 4A is a diagram exemplifying a schematic configuration of the power supply device 100 according to the second embodiment.

The power supply device 100 includes the controller 101; the AC/DC charging circuit 102; the secondary battery 103; the DC/AC output circuit 104; the superposition circuit 105; and a communication unit 109. The power supply device 100 according to the second example is different from that of the first example in a point that the power supply device 100 according to the second example includes the communication unit 109, instead of the power sensor 106.

The communication unit 109 of the power supply device 100 is an example of a communication unit. The communication unit 109 is capable of communicating data with a communication unit 31, which is included in the load 30.

The load 30 includes a storage unit, such as a memory. The memory stores expected power consumption amounts which are consumed during corresponding operation modes (for example, when the load 30 is a water heater, the operation modes include a rapid water heating mode and a normal water heating mode). The communication unit 31 of the load 30 retrieves a expected power consumption amount from the memory, depending on an operation mode of the load 30 which is selected by a user, and the communication unit 31 transmits the retrieved expected power consumption amount to the communication unit 109 of the power supply device 100.

As the communication units 31 and 109, a cable system or a short-range radio communication system may be utilized. As a short-range radio communication system, for example, IEEE 802.15; Bluetooth (registered trademark); Zigbee (registered trademark); Felica; TransferJet; Personal Area Network; or RFID may be adopted.

The controller 101 controls the DC/AC output circuit 104, depending on the expected power consumption amount of the load 30, which is to be received by the communication unit 109. The controller 101 causes the superposition circuit 105 to superpose electric power output from the secondary battery 103 on electric power supplied from the electric power system 10, and the resultant power is output to the load 30. Accordingly, the power supply device 100 can supply power which is greater than or equal to a predetermined power limit of the electric power system 10, which is defined by the breaker 1 of the power distribution panel 20.

Figure 4B:
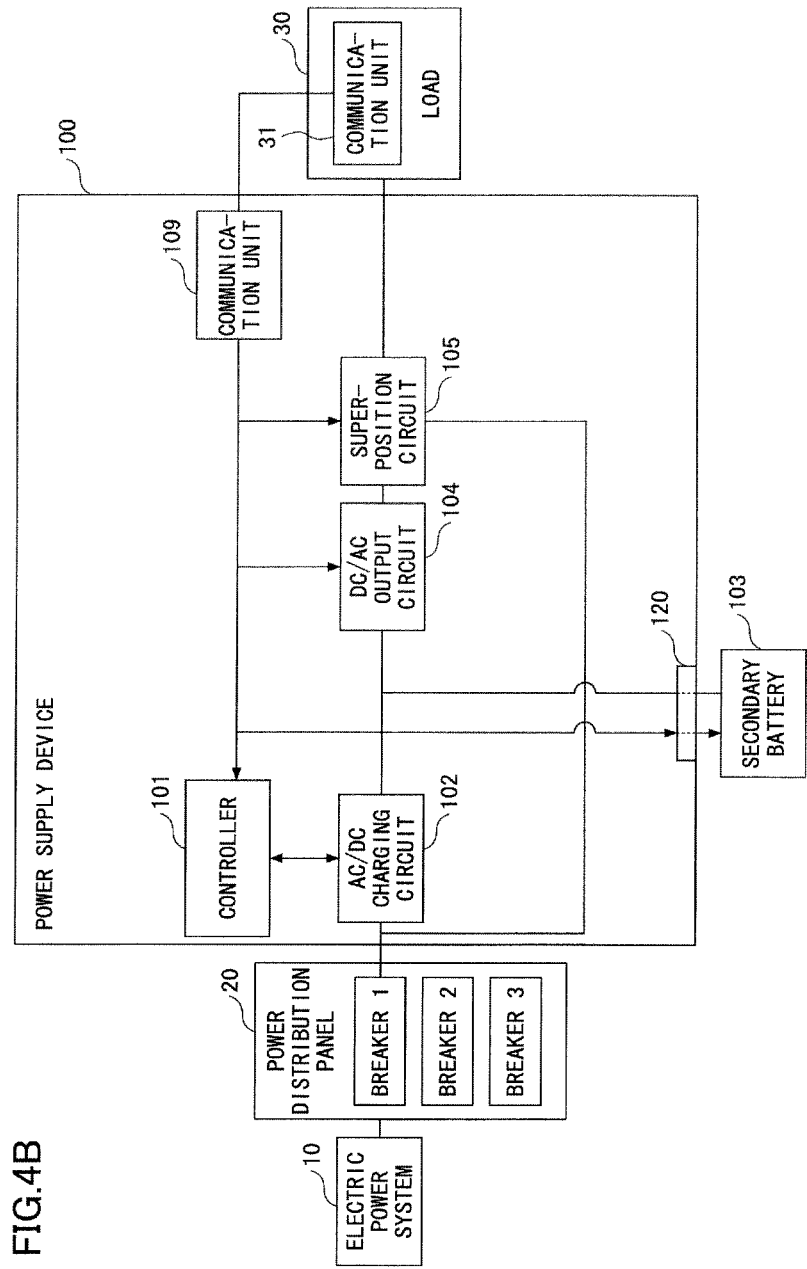

Here, as depicted in FIG. 4B, the secondary battery 103 may be detachably attached to the power supply device 100 as an external battery. The power supply device 100 may include the battery terminal 120 that is used to connect the secondary battery 103.

FIG. 5 shows an example of a flowchart of a power supply process according to the second example.

In the power supply process of the power supply device 100, at step S21, the communication unit 109 of the power supply device 100 receives a expected power consumption amount of the load 30, which is transmitted from the communication unit 31 of the load 30. Subsequently, at step S22, the controller 101 determines whether the expected power consumption amount of the load 30, which is received by the communication unit 109, is greater than 1500 W, for example. Here, an amount of power to be compared with the expected power consumption amount of the load 30 by the controller 101 may be adjusted to be a suitable amount of power, which is less than the power limit (which is 1500 W in this example) defined by the breaker 1 of the power distribution panel 20.

When the expected power consumption amount of the load 30 is greater than 1500 W, at step S23, the controller 101 finds a residual electric energy amount of the secondary battery 103, and the controller 101 determines whether power which is greater than or equal to 1500 W can be supplied to the load 30. When it is possible to supply the power (which is greater than or equal to 1500 W), at step S24, the communication unit 109 reports permission to use electric power which is greater than or equal to 1500 W, together with available time, to the load 30. Subsequently, at step S15, the controller 101 controls the DC/AC output circuit 104, and the DC/AC output circuit 104 causes the secondary battery 103 to output electric power. At this time, the controller 101 causes the secondary battery 103 to output a difference between the expected power consumption amount of the load 30 and an amount of electric power supplied from the electric power system 10. When the DC/AC output circuit 104 causes the secondary battery 103 to output the electric power, the superposition circuit 105 superposes electric power output from the secondary battery 103 on electric power supplied from the electric power system 10, and the resultant power is supplied to the load 30. Accordingly, the load 30 can operate by receiving electric power which is greater than electric power supplied from the electric power system 10 through the breaker 1.

When it is impossible to supply electric power which is greater than or equal to 1500 W to the load 30, at step S26, the communication unit 109 reports to the load 30 that electric power which is greater than or equal to 1500 W is not available. Subsequently, at step S27, the power supply device 100 only supplies electric power which is supplied from the electric power system 10 to the load 30.

When the expected power consumption amount of the load 30 is less than or equal to 1500 W, at step S27, the controller 101 does not cause the secondary battery 103 to output electric power, and the power supply device 100 only supplies electric power which is supplied from the electric power system 10 to the load 30.

The power supply device 100 controls an electric power amount to be supplied to the load 30 by executing the above-described process by the controller 101 in a fixed cycle.

As explained above, in the power supply device 100, the communication unit 109 receives the expected power consumption amount as a power consumption amount of the load 30. The power supply device 100 superposes electric power output from the secondary battery 103, which depends on the expected power consumption amount of the load 30, on electric power supplied from the electric power system 10, and the power supply device 100 outputs the resultant electric power. Accordingly, the load 30 can operate by receiving electric power which is greater than or equal to the power limit of the electric power system 10, which is defined by the breaker 1 of the power distribution panel 20.

Additionally, the power supply device 100 according to the second example may include the current limiting circuit 107 and a display 108, similar to the first example.

Third Example

Hereinafter, a third example is explained based on the drawings. Here, explanation is omitted for portions of configurations which are the same as the corresponding portions of the first example and/or the second example.

Figure 6B:
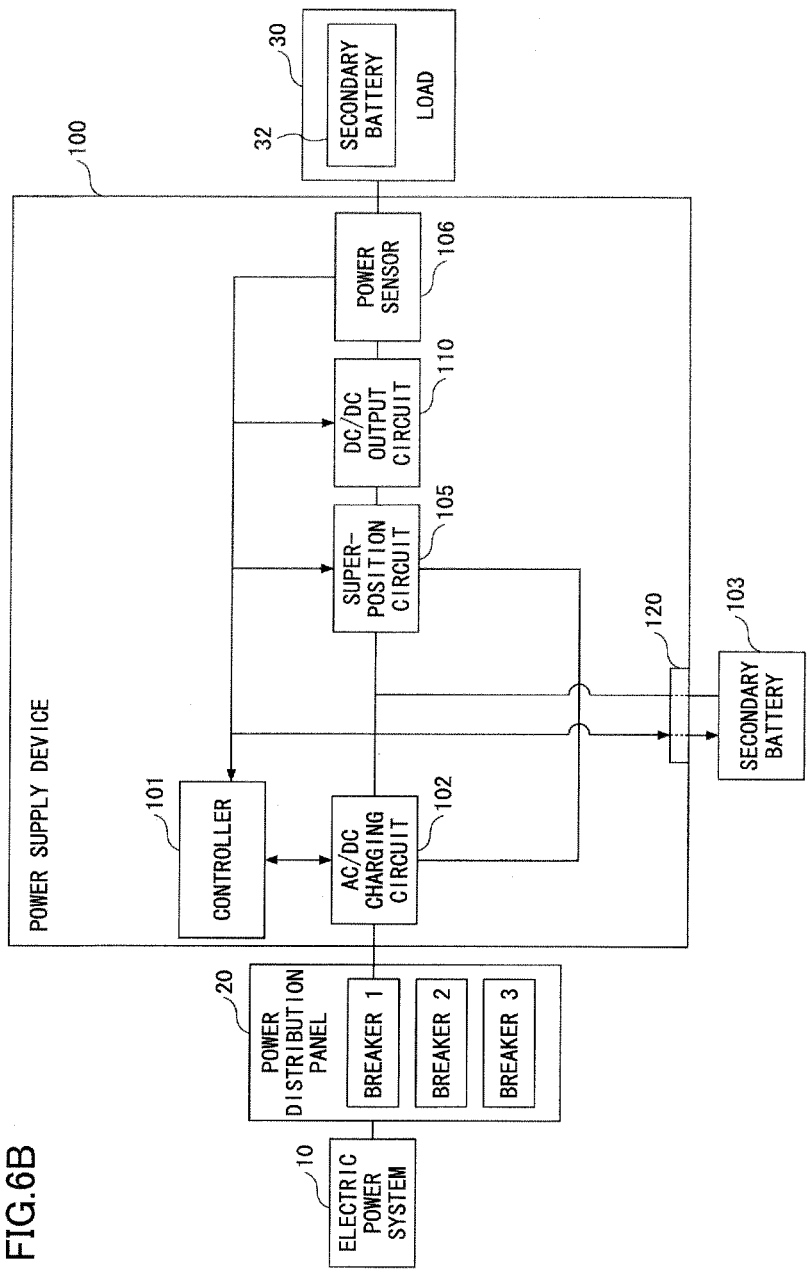

FIG. 6A is a diagram exemplifying a schematic configuration of the power supply device 100 according to a third example. The power supply device 100 according to the third example functions as a battery charger of the secondary battery 32, which is included in the load 30.

The power supply device 100 includes the controller 101; the AC/DC charging circuit 102; the secondary battery 103; the superposition circuit 105; a DC/DC output circuit 110; and the power sensor 106.

The AC/DC charging circuit 102 converts AC power supplied from the electric power system 10 through the breaker 1 of the power distribution panel 20 into DC power, and the AC/DC charging circuit 102 outputs the DC power to the superposition circuit 105. When the AC/DC charging circuit 102 is controlled by the controller 101 and the AC/DC charging circuit 102 does not supply electric power to the load 30, the AC/DC charging circuit 102 charges the secondary battery 103 by supplying electric power.

The secondary battery 103 outputs stored energy as DC power to the superposition circuit 105, and the superposition circuit 105 outputs DC power, in which the electric power from the secondary battery 103 is superposed on electric power from the electric power system 10, to the DC/DC output circuit 110. The DC/DC output circuit 110 outputs DC power to a secondary battery 32 of the load 30.

In the power supply device 100 according to the third example, the controller 101 controls the superposition circuit 105 depending on a measured value of the power sensor 106, and the controller 101 causes the secondary battery 103 to output electric power. The superposition circuit 105 controls output from the secondary battery 103. At the same time, the superposition circuit 105 has a function to superpose electric power from the secondary battery 103 on electric power from the electric power system 10 through the AC/DC charging circuit 102. The superposition circuit especially compensates time-dependent variation of the output voltage from the secondary battery 103. The DC/DC output circuit 110 converts electric power to be output from the superposition circuit 105 into a voltage which is adjusted for the secondary battery 32 of the load 30.

Thus, with the power supply device 100 according to this example, it is possible to supply electric power to the load 30, which is greater than or equal to the power limit of the electric power system 10 defined by the breaker 1 of the power distribution panel 20. Accordingly, the secondary battery 32 of the load 30 can be charged in a short time period.

As depicted in FIG. 63, the secondary battery 103 may be detachably attached to the power supply device 100 as en external battery. The power supply device 100 may include the battery terminal 120 that is used to connect the secondary battery 103.

Here, instead of the power sensor 106 of the power supply device 100, the communication unit 109 may be included in the power supply device 100. The controller 101 may control electric power to be supplied to the load 30 through the DC/DC output circuit 110, depending on a necessary amount of electric power which is necessary for the secondary battery 32 of the load 30. The necessary amount of electric power is transmitted from the communication unit 31 of the load 30. In this case, a storage unit, which is included in a battery pack including the secondary battery 32 of the load 30, stores information, such as the necessary amount of electric power. The communication unit 31 of the load 30 transmits the necessary amount of electric power to the communication unit 109 of the power supply device 100. When the necessary amount of electric power of the load exceeds an amount of electric power which can be supplied by the electric power system 10, the controller 101 causes the secondary battery 103 to output a difference between the necessary amount of electric power of the load 30 and the amount of electric power which can be supplied by the electric power system 10.

Additionally, the power supply device 100 according to the third example may include the current limiting circuit 107 and the display 108, similar to the first and second examples.

Additionally, the power supply device 100 and the load 30 may include corresponding communication units, and the power sensor 106 may be included in the load 30, instead of the power supply device 100. In this case, the power sensor 106 of the load 30 may measure electric power which is output from the power supply device 100, and the communication unit of the load 30 may transmit a measurement result to the power supply device 100. The power supply device 100 may receive the result of the measurement of power from the load 30, and the power supply device 100 may cause the secondary battery 103 to output electric power, depending on necessity.

Fourth Example

Hereinafter, a fourth example is explained based on the drawings. Here, explanation is omitted for portions of configurations which are the same as those of the above-described examples.

Figure 7A:
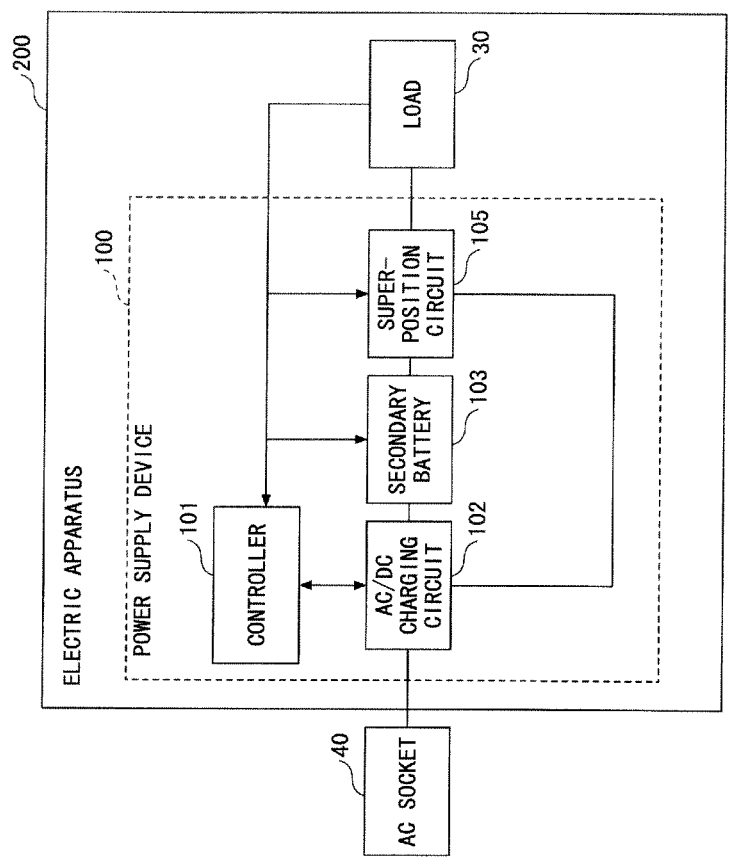
FIGS. 7A and 7B are diagrams exemplifying configurations of the power supply device according to a fourth example.

FIG. 7A is a diagram exemplifying a schematic configuration of an electric apparatus 200 according to a fourth example. The electric apparatus 200 includes the load 30; and the power supply device 100. The electric apparatus 200 is connected to an AC socket 40.

The power supply device 100 includes the controller 101; the AC/DC charging circuit 102; the secondary battery 103; and the superposition circuit 105.

The controller 101 retrieves an expected power consumption amount of the load 30 from a memory included in the electric apparatus 200, depending on an operation mode of the load 30, which is selected by a user. The controller 101 controls the superposition circuit 105 depending on the retrieved expected power consumption amount, and the controller 101 causes the secondary battery 103 to output electric power.

The superposition circuit 105 controls output of the secondary battery 103. At the same time, the superposition circuit 105 has a function to superpose electric power output from the secondary battery 103 on electric power which is supplied from the AC socket 40 and output from the AC/DC charging circuit 102. The superposition circuit 105 supplies the resultant output to the load 30.

Accordingly, in the electric apparatus 200 according to this example, the load can be used with electric power which is greater than or equal to the maximum electric power which can be supplied from the AC socket 40.

Figure 7B:
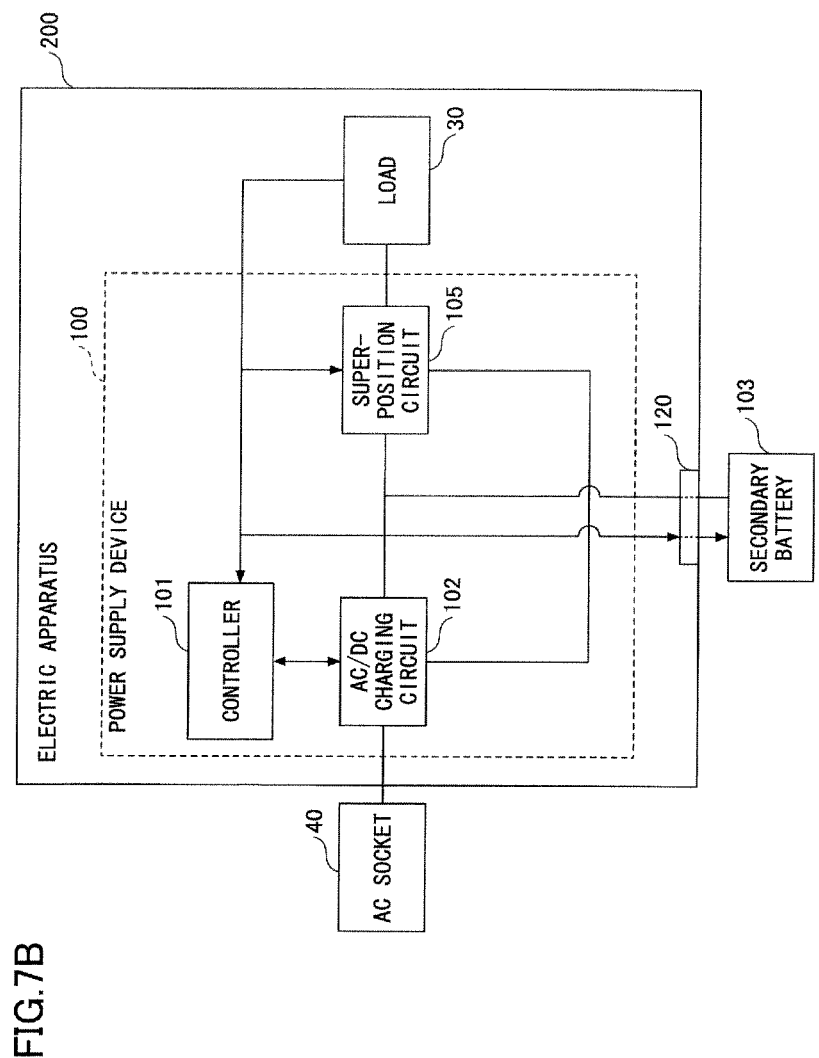

Here, as depicted in FIG. 7B, the secondary battery 103 may be detachably attached to the power supply device 100 as a battery outside the electric apparatus 200. The power supply device 100 may include the battery terminal 120 that is used to connect the secondary battery 103.

FIG. 8 shows an example of a flowchart of a power supply process in the fourth example.

In the power supply process of the electric apparatus 200, at step S31, the controller 101 retrieves an expected power consumption amount of the load 30. Subsequently, at step S32, the controller 101 determines whether the expected power consumption amount of the load 30 is greater than 1500 W, for example. Here, an amount of power to be compared with the expected power consumption amount of the load 30 by the controller 101 may be adjusted to be a suitable amount of power, which is less than the maximum power (which is 1500 W in this example) which can be supplied by the AC socket 40.

When the expected power consumption amount of the load 30 is greater than 1500 W, at step S33, the controller 101 controls the superposition circuit 105, and the controller causes the secondary battery 103 to output electric power. At this time, the controller 101 causes the secondary battery 103 to output a difference between the expected power consumption amount of the load 30 and an amount of power supplied from the AC socket 40. The superposition circuit 105 superposes electric power supplied from the AC socket 40 on electric power output from the secondary battery 103, and the superposition circuit 105 outputs the resultant electric power to the load 30. Accordingly, the load 30 can operate with electric power which is greater than the maximum power which can be supplied from the AC socket 40.

When the expected power consumption amount of the load 30 is less than or equal to 1500 W, at step S34, the controller 101 causes the secondary battery 103 not to output electric power. The controller 101 causes only electric power, which is supplied from the AC socket 40, to be supplied to the load 30.

The electric apparatus 200 controls an electric power amount to be supplied to the load 30 by executing the above-described process by the controller 101 in a fixed cycle.

As described above, in the electric apparatus 200, the controller 101 retrieves the expected power consumption amount of the load 30. The electric apparatus 200 superposes electric power output from the secondary battery 103 on electric power supplied from the electric power system 10, depending on the expected power consumption amount of the load 30, and the electric apparatus 200 outputs the resultant electric power. Accordingly, the load 30 can operate by receiving electric power which is greater than or equal to the maximum power which can be supplied form the AC socket 40.

The electric apparatus 200 may be a generic appliance, such as an electric water heater, a water heater, a coffee maker, a hair dryer, an electric washing toilet seat, a vacuum cleaner, a microwave oven, or a toaster.

The electric apparatus 200 according to the fourth example can be used with electric power which is greater than or equal to the maximum power which can be supplied from the AC socket 40. By increasing an amount of usable power, for example, for the electric water heater, the water heater, or the coffee maker, water can be heated in a shorter time period. For the hair dryer, an air volume and temperature of warm air can be increased. For the electric washing toilet seat, temperature can be increased in a shorter time period. For the vacuum cleaner, suction force can be increased. For cooking appliances, such as the microwave oven or the toaster, a time period for cooking can be reduced.

Additionally, the power supply device 100 of the electric apparatus 200 according to the fourth example may include the power sensor 106 and/or the communication unit 109 as the power consumption amount retrieve unit. Additionally, the power supply device 100 of the electric apparatus 200 may include the current limiting circuit 107 and/or the display 108.

Hereinabove, the power supply device and the electric apparatus according to the embodiment are explained. However, the present invention is not limited to the above described embodiment, and various modifications and improvements may be made within the scope of the present invention.

The present application is based on and claims the benefit of priority of Japanese Priority Application No. 2012-287142 filed on Dec. 28, 2012, the entire contents of which are hereby incorporated herein by reference.

What is claimed is:

1. A power supply device configured to be connected to an external power supply and configured to supply electric power to a load, the power supply device comprising:
   a battery terminal configured to connect to a secondary battery;
   a superposition unit configured to superpose second electric power output from the secondary battery on first electric power supplied from the external power supply, and to output resultant electric power, including (i) the second electric power output from the secondary battery superposed on (ii) the first electric power supplied from the external power supply, to the load;
   a power consumption amount retrieve unit including a communication unit to receive an expected power consumption amount from the load; and
   a controller configured to control an amount of the second electric power to be output from the secondary battery, based on the power consumption amount received by the communication unit, the controller determining whether the power consumption amount can be supplied to the load, and the communication unit transmitting a determination result, by the controller, of whether the power consumption amount can be supplied to the load,
   wherein the controller provides a control output to the superposition unit to cause the superposition unit to (i) superpose second electric power output from the secondary battery on first electric ewer su lied from the external power supply and output the resultant electric power to the load, and (ii) when an amount of power consumed by the load increases, increase the amount of power supplied from the superposition unit to the load.

2. The power supply device according to claim 1, wherein, when the power consumption amount is greater than a predetermined amount of electric power, the controller causes the secondary battery to output the second electric power.

3. The power supply device according to claim 2, wherein the controller causes the secondary battery to output a difference between the power consumption amount and the predetermined amount of the electric power.

4. The power supply device according to claim 1, wherein the power consumption amount retrieve unit is a power sensor configured to measure the resultant electric power, the resultant electric power being output from the superposition unit to the load, and wherein the controller is configured to control the amount of the second electric power to be output from the secondary battery, based on a value measured by the power sensor.

5. The power supply device according to claim 1, further comprising:
   a current limiting unit configured to limit a current flowing from the external power supply to the superposition unit.

6. The power supply device according to claim 1, further comprising:
   a display unit configured to display a residual electric energy amount of the secondary battery.

7. The power supply device according to claim 1, wherein the secondary battery is detachably attached to the battery terminal of the power supply device as an external battery.

8. An electric apparatus comprising:
   a load; and
   a power supply device configured to be connected to an external power supply and configured to supply electric power to the load,
   wherein the power supply device includes
   a battery terminal configured to connect a secondary battery;
   a superposition unit configured to superpose second electric power output from the secondary battery on first electric power supplied from the external power supply, and to output resultant electric power, including (i) the second electric power output from the secondary battery superposed on (ii) the first electric power supplied from the external power supply, to the load;
   a power consumption amount retrieve unit including a communication unit to receive an expected power consumption amount from the load; and
   a controller configured to control an amount of the second electric power to be output from the secondary battery, based on the power consumption amount received by the communication unit, the controller determining whether the power consumption amount can be supplied to the load, and the communication unit transmitting a determination result, by the controller, of whether the power consumption amount can be supplied to the load,
   wherein the controller provides a control output to the superposition unit to cause the superposition unit to (i) superpose second electric power output from the secondary battery on first electric power supplied from the external power supply and output the resultant electric power to the load, and (ii) when an amount of power consumed by the load increases, increase the amount of power supplied from the superposition unit to the load.

9. The electric apparatus according to claim 8, wherein the secondary battery is detachably attached to the terminal of the power supply device as a batter outside the electric apparatus.

* * * * *